Dec. 26, 1972 E. J. STEVENS 3,707,416
SKEWED BILLETS FOR MAKING LOUVERED FILMS
Filed Oct. 30, 1970 2 Sheets-Sheet 1

INVENTOR.
EDWARD J. STEVENS
BY Kinney, Alexander,
Sell, Steldt & DeLaHunt
ATTORNEYS INVENTOR.
EDWARD J. STEVENS
BY Kinney, Alexander,
Sell, Steldt & DeLaHunt
ATTORNEYS

United States Patent Office 3,707,416
Patented Dec. 26, 1972

3,707,416
SKEWED BILLETS FOR MAKING
LOUVERED FILMS
Edward J. Stevens, Lake Elmo, Minn., assignor to Minnesota Mining and Manufacturing Company, St. Paul, Minn.
Filed Oct. 30, 1970, Ser. No. 85,492
Int. Cl. B32b *31/00;* B44f *1/00*
U.S. Cl. 156—196
8 Claims

ABSTRACT OF THE DISCLOSURE

Method and apparatus are described for forming a skewed billet from coated film mounted around a shaft and deformed so that the transverse coatings assume conical forms with angles of 5° to 50°.

---

This invention relates to a process for producing louvered film having the louvers inclined from a strictly transverse direction by definite and consistent amounts such that the webs are asymmetrically transparent. The invention further relates to the process for producing billets which can be skived to produce these films and to the films made by this process.

The production of louvered films by skiving of billets of plastic material having transverse opaque layers is described in U.S. Pat. 3,524,789. In such a film the resultant louvers are desirably directly transverse of the film and make an angle of 0°±3° with the perpendicular to the film and are transparent when viewed directly. Such billets are composed by mounting layers of transparent film coated on one surface with a contrasting, suitably opaque layer which may be colored and molded to a solid mass. With suitable care in the production, the majority of the product has zero degree louvers with a variation of ±3°.

For some purposes, it is desirable to have louvers which form an angle of 5° to 50° with a perpendicular so that the film is transparent at angle with the perpendicular from one direct line but *not* from another direction. Furthermore, it is desirable that this angle be held reasonably constant throughout considerable areas of such material as otherwise the area will have a peculiar, somewhat blotchy appearance and will not all be useable for many purposes. Such sheets are conveniently described as asymmetrically transparent and the angle which the louvers make with the perpendicular to the plane of the film is herein termed the angle of asymmetry.

It is an object of this invention to produce louvered films having uniform angles of the louvers from vertical which are asymmetrically transparent. A further object of the invention is to produce a billet which can be skived to give film having canted louvers. Another object is to produce a skewed billet. Other objects will become apparent from the description hereinafter.

In accordance with the objects of the invention, it has been found that by novel process techniques in the molding of an integral cylindrical billet of thermoplastic polymer having regularly alternating thick clear laminae and relatively thin contrasting laminae transverse of the axis of said billet, which would otherwise give a normal zero degree louver, it is possible to skew the billet so that when skived it yields the desired canted louvers having asymmetric transparency. This process is effected by putting suitable male and female conical shims in the mold at the top and the bottom of the formed billet such that the pressure means exerts a longitudinal deformation uniformly in the billet. The process of the invention is more readily explained by reference to the drawings wherein:

Figures 1, 6:
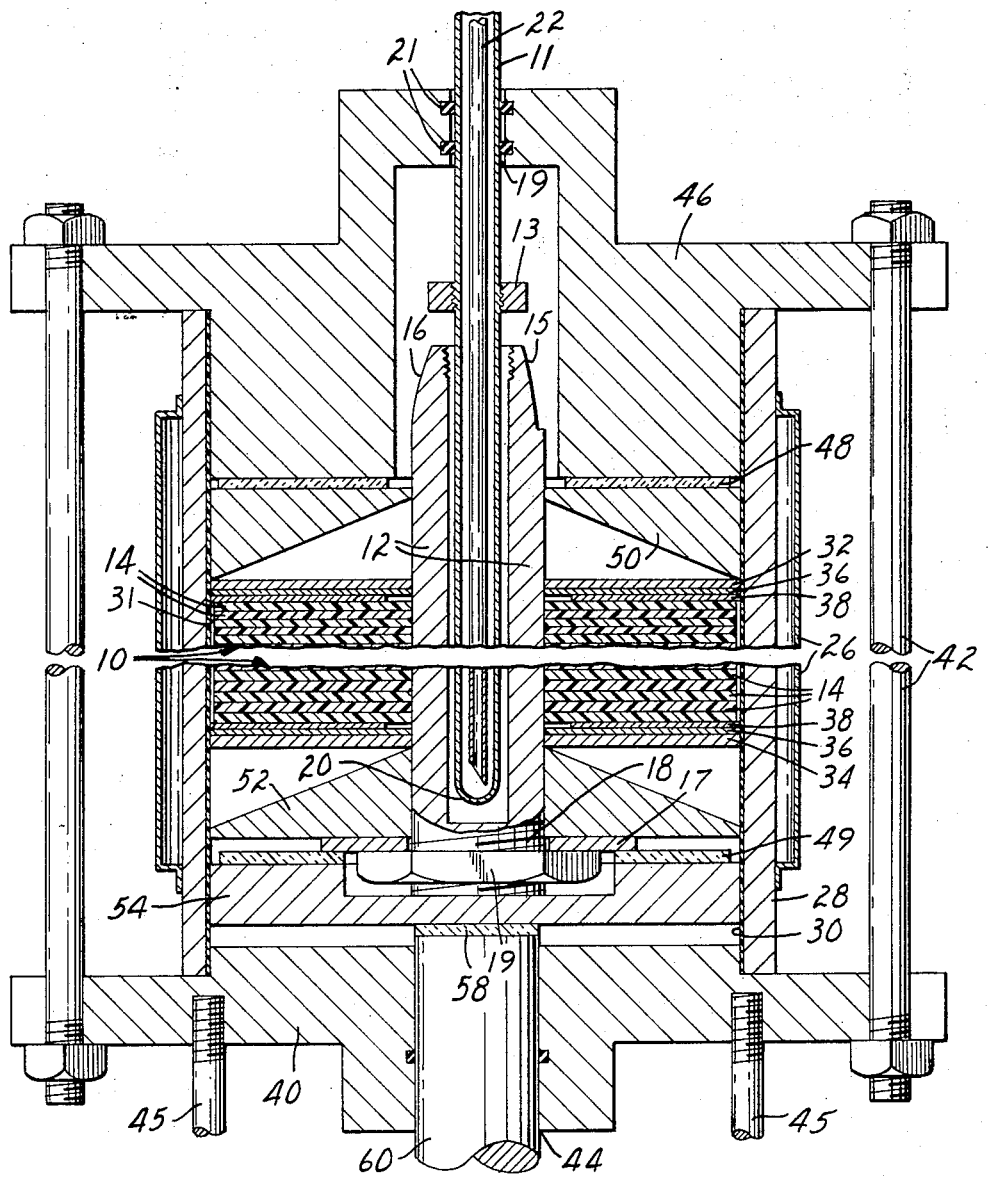
FIGS. 1, 2 and 3 show successive stages in the process of the invention by which a billet is skewed.
FIG. 6 shows a cross-section through a portion of a film skived from a billet of the invention and having asymmetric transparency.

Referring to FIG. 1, which is somewhat diagrammatic and not to scale, there is shown the manner in which billet 10 on shaft 12 comprising disks 14 having the opaque surfaces (represented by the lines) alternating with clear portions is positioned for the process of the invention. The slight space 31 at the edges of the billet is present because of removal of a nonadherent wrapping, e.g., polytetrafluoroethylene, which is present during formation of the billet and is removed so that positioning in the constraining means which is mold 28 is facilitated. The billet is not cooled before assembling as shown and ease of handling is therefore desirable but not indispensible. One end 16 of the shaft is shaped with a flattened side 15 to permit grasping in the mating chuck of a lathe (not shown) and is provided with central hole 20 for the admission of a finger heater 11 and the other end 18 is threaded. Hole 20 is threaded for attachment of an eye for lifting shaft 12 and billet 10 as needed during the process of the invention. Finger heater 11, having inner tube 22 fits hole 20 in the shaft and passes through upper retaining plate 46 by sliding seal 19 and O-ring 21. It is positioned and prevented from slipping through seal 19 by retaining nut 13. The structure (not shown) is of the upper end of finger 11 and includes an eye by which it is raised thereby raising also upper plate 46, and also inlet and outlet for circulating steam through finger 11.

Figure 4:
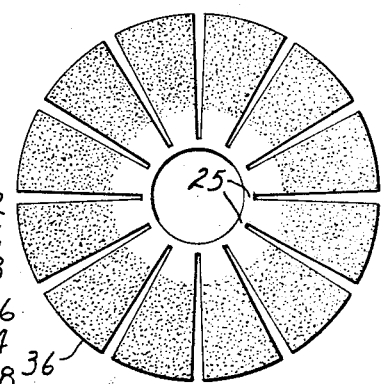
FIGS. 4 and 5 show respectively a star plate and a ring plate as employed in the process of the invention.
Figure 5:
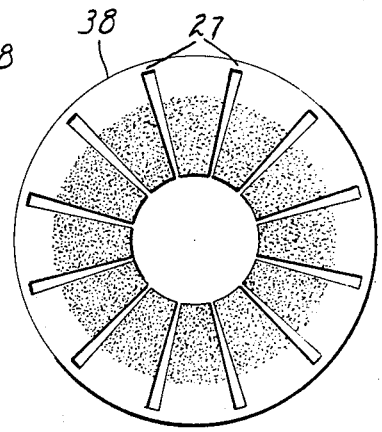

As assembled for the process of the invention, pairs of star and ring steel disks 36 and 38 (shown in FIGS. 4 and 5 of a thickness of about 0.03 inch. (0.75 mm.) are positioned above and below the billet with slots staggered. In this way, lobes of the one disk seal slots in the other disk. Additional means (not shown) for pressure distribution such as polytetrafluorethylene sheet or other polymeric material may be included between the billet and the steel disks. In addition, a steel ring disk 32 about ⅛ inch (3 to 5 mm.) thick is inserted at the top below female pressure cone 50 and a steel star disk 34 of similar thickness is inserted at the bottom immediately above male pressure cone 52. To minimize heat losses, it is desirable to preheat heavy pieces such as disk 32 and 34 and cones 50 and 52. Although cone pieces 50 and 52 may include cylindrical portions, the angle of the conical portion of each of the cones used together in given operation (male and female cones) will be the same and may be from about 5° to about 45° and preferably in the range of 10° to 35° depending on the angle of asymmetry sought in the finished film. Both should be within about 1° of the same angle. Suitable variations in positioning disks on the shaft may be required and threading at the end of the shaft may have to be longer for cones with greater angles. Those shown in the drawings (50 and 52) have an angle of 20° and are representative. Heat is provided externally to billet mold 28 by steam jacket 26 (having inlet and outlet not shown). Billet mold 28 has polytetrafluoroethylene liner 30. Tie rods 42 and upper retaining plate 46 secure billet mold 28 on stand 40 which latter is attached by tie rods 45 to the base of pressure means (not shown) acting through piston 60 against upper retaining plate 46 as compression means exerting continuous longitudinal pressure on billet 10. The stack of disks 14 is separated from upper retaining plate 46 by insulation 48 and female pressure cone 50. Pressure is exerted from below by male pressure cone 52 separated by further insulation 49 from ram plate 54 which is also separated from piston 60, acting through opening 44 in stand 40, by insulating shim 58. The pressure cones fit tightly around shaft 16 and male pressure cone 52 and pressure plate 17 are prevented from slipping from the lower end of shaft 12 by nut 19.

It will be seen that, at temperatures at which the polymer of billet 10 becomes thermoplastic, force applied from piston 60 will force shaft 12 and adherent disks 14 upward while deforming plates 32, 34, 36 and 38 into the shapes of the pressure cones. This is further illustrated in FIGS. 2 and 3.

Figure 2:
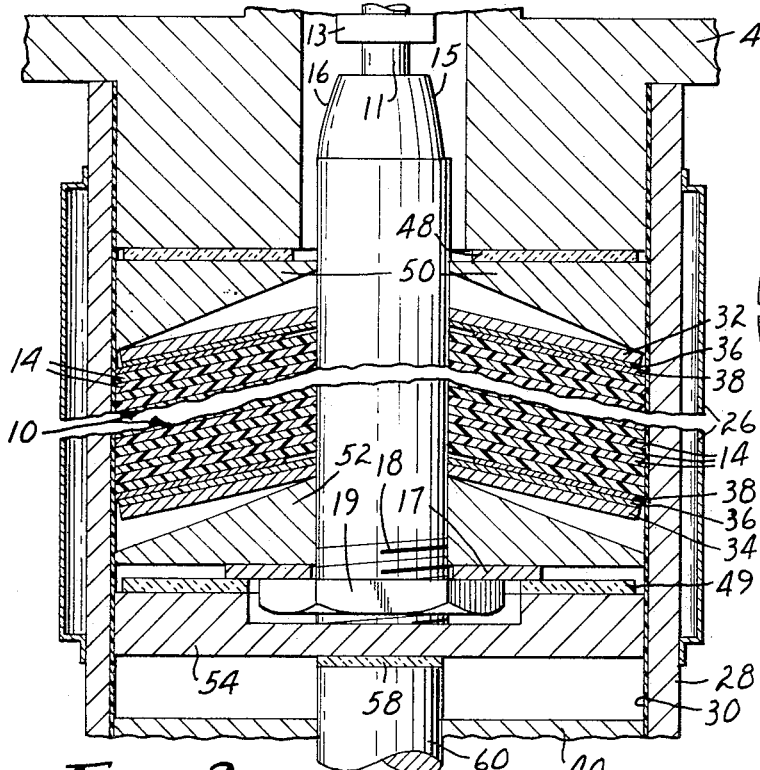
Figure 3:
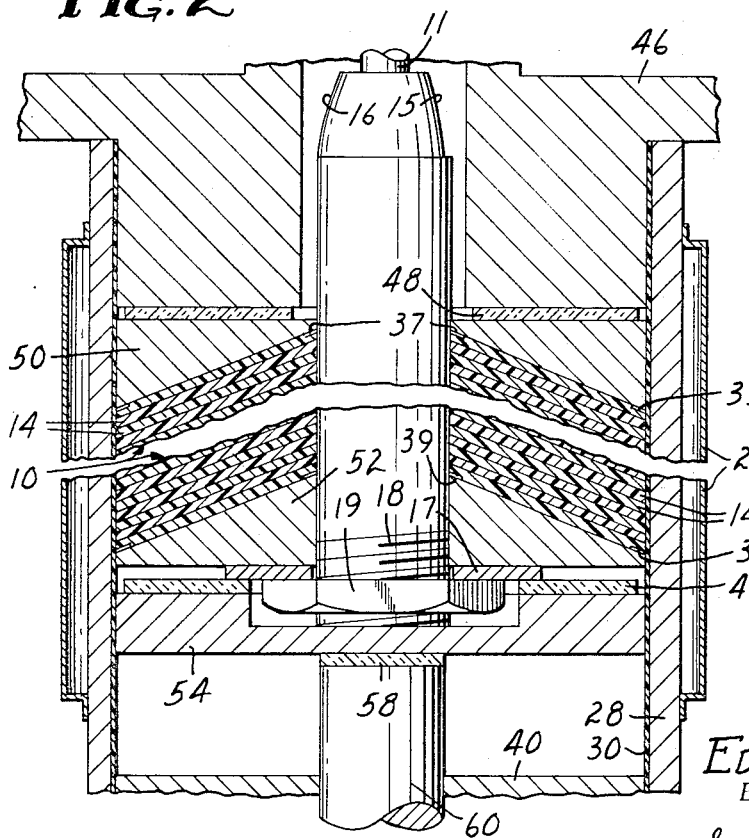

In FIG. 2, shaft 12 and adherent polymer of the billet 10 has been displaced approximately half the distance necessary using a 20° cone which is necessary for obtaining 20° angle of asymmetry in the film skived from the skewed billet. The completion of displacement or skewing is shown in FIG. 3. The indicia in FIG. 2 are identical with those in FIG. 1, but for convenience only the pertinent central portions of the apparatus are shown and the shaft is not shown in cross-section.

For completion of the process, after deformation has proceeded so far that substantially no space remains between the pressure cones and ring and star 32 and 34, it is most satisfactory to disassemble the apparatus without permitting appreciable cooling and insert four silicone rings 33, 35, 37 and 39 as shown in FIG. 3 in place of the ring and star disks 32, 34, 36 and 38 of FIGS. 1 and 2. The whole is reassembled and pressure reapplied until no further displacement can be observed. These rings which are about $\frac{1}{32}$ inch (0.8 mm.) thick and about $\frac{1}{4}$ inch (6.5 mm.) wide, prevent extrusion also known as "flashing" of polymer into the spaces between the pressure cones and the shaft or the wall of the mold. Alternative means for accomplishing the same result are, of course, equally applicable.

Referring to FIGS. 3 and 4, these show examples of star and ring disks 32 and 34 and hence are illustrative also of star and ring disks 36 and 38. In the case of the thick disks 32 and 34, the continuous non-slotted portion is about 1½ to about 3 times the thickness. For example, 25 and 27 in those shown are about ¼ inch (6.5 mm.) wide and will obviously be made no heavier than can be deformed with reasonable forces for the particular material used. In the case of the thinner disks 36 and 38, the non-slotted continuous portion will be from about ⅛ inch (3 mm.) up to about ⅜ inch (10 mm.) and in those used as described are ¼ inch (6.5 mm.). The slots separating the lobes of the star disks are wider at the periphery than toward the center by an amount sufficient so that expected deformation can occur without interference between adjacent lobes. The number of lobes may be from 5 or 6 upward to about 12 as shown or more but very large numbers are not necessary. The holes in the thin ring disks are rather larger in diameter than those in the thin star disks but this is not critical to the invention.

In a typical process of the invention, after the billet is formed using both a wrapping and end covers of polytetrafluoroethylene (about 0.1 mm. thick) and is molded at the appropriate temperature, e.g., at 240° F. (115° C.), for cellulose acetate butyrate it is quickly reassembled with pressure distributing means, e.g., star and ring disks as described and male and female pressure cones as described and deformed at the same temperature under sufficient continuous force to give about 3.3 mm. longitudinal displacement per hour. The exact rate is not critical but much slower is tedious and too fast may result in undesirable distortion of the billet. After substantial conformity to the cones has been achieved using the metallic star and ring disks the assembly may be dismantled and antiflash means, e.g., silicone rings, inserted and pressure continued at the appropriate temperature. It is found that the polymer of the billet retains some memory of previous shapes and is advantageously subjected to a period of heating above the temperature to be adopted for skiving. In the case of a cellulose acetate butyrate billet, a cycle of 6 hours at 300° F. (150° C.) while maintaining about 10 p.s.i. pressure is sufficient because skiving is normally performed at temperatures not much above that temperature. Cooling is done gradually first for a period of a few hours at an intermediate temperature, e.g., 3 hours at 235° F. (113° C.) and 10 p.s.i., and then stopping heating while maintaining pressure until the billet has cooled to about 50° C.

Skewed billets of other thermoplastic polymers are made similarly such as from polycarbonates, polyvinylbutyral and others which are processed as will be evident at somewhat different temperatures from those employed above with cellulose acetate butyrate.

Skiving of the skewed billet produced as described above by the process of U.S. Pat. 2,524,789 provides a film as shown in FIG. 6 having clear portions 132 and louvers 134.

What is claimed is:

1. A process for the production of a web of asymmetrically transparent plastic film from an integral cylindrical billet of thermoplastic polymer having regularly alternating relatively thick clear laminae and relatively thin contrasting laminae transverse of the axis of said billet, comprising the step of skewing said billet by longitudinal continuous pressure in a circumferentially restrained mold between a pair of male and female cones having essentially the diameter of said billet and an angle of from 5° to 50°.

2. A process according to claim 1 wherein staggered pairs of relatively thin star and ring disks having at least 5 lobes are interposed at the ends of the billet and the respective male and female cones together with a relatively thick star disk at one end and a relatively thick ring disk at the other end positioned between said cones and said pairs of relatively thin disks.

3. A process according to claim 1 wherein flashing of polymer from the billet around the cones is prevented by antiflash means.

4. A process according to claim 1 wherein skewing is carried out at a first temperature under pressure and heating is continued at a higher temperature under pressure for a time sufficient to reduce plastic memory in said billet.

5. A process according to claim 4 wherein the thermoplastic polymer is cellulose acetate butyrate and contrasting layers are black pigmented, the first temperature is about 140° C. and the higher temperature is 150° to 160°.

6. A skewed billet produced by the process of claim 1.
7. A skewed billet produced by the process of claim 4.
8. A skewed billet produced by the process of claim 5.

References Cited

UNITED STATES PATENTS

| | | | |
|---|---|---|---|
| 3,524,789 | 8/1970 | Olsen | 161—6 |
| 3,216,468 | 11/1965 | Allan | 156—250 X |
| 2,245,170 | 6/1941 | Von Ende et al. | 156—255 X |

FOREIGN PATENTS

| | | | |
|---|---|---|---|
| 548,027 | 9/1942 | Great Britain | 156—250 |

RALPH S. KENDALL, Primary Examiner

U.S. Cl. X.R.

156—222, 255, 101, 102; 161—6